(12) United States Patent
Mcgee et al.

(10) Patent No.: US 11,097,340 B2
(45) Date of Patent: Aug. 24, 2021

(54) POWDER CLEANING SYSTEMS AND METHODS

(71) Applicant: Hamilton Sundstrand Corporation, Charlotte, NC (US)

(72) Inventors: Randolph Carlton Mcgee, Hamden, CT (US); Ying She, East Hartford, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 236 days.

(21) Appl. No.: 16/194,830

(22) Filed: Nov. 19, 2018

(65) Prior Publication Data
US 2020/0156149 A1    May 21, 2020

(51) Int. Cl.
*B01J 8/24* (2006.01)
*B01J 8/18* (2006.01)
(Continued)

(52) U.S. Cl.
CPC ............ *B22F 1/0081* (2013.01); *B01J 8/006* (2013.01); *B01J 8/1818* (2013.01); *B01J 8/24* (2013.01); *B01J 8/44* (2013.01); *B33Y 40/00* (2014.12); *B01J 2208/00017* (2013.01); *B01J 2208/00539* (2013.01); *B01J 2208/00548* (2013.01); *B22F 10/20* (2021.01); *B33Y 10/00* (2014.12)

(58) Field of Classification Search
CPC ...... B01J 8/1818; B01J 8/1809; B01J 8/1872; B01J 8/44; B01J 8/006; B01J 8/24; B01J 2208/0017; B01J 2208/00539; B01J 2208/00548; B22F 1/0081; B22F 1/0085; B22F 1/0088
See application file for complete search history.

(56) References Cited

U.S. PATENT DOCUMENTS

| 7,776,129 B2 | 8/2010 | Curlook et al. |
| 8,926,728 B2 | 1/2015 | Nepper et al. |

(Continued)

FOREIGN PATENT DOCUMENTS

| DE | 19921059 A1 | 11/2000 |
| EP | 0900590 A1 | 3/1999 |

(Continued)

OTHER PUBLICATIONS

Extended European search report issued in corresponding EP Application No. 19209151.0, dated Feb. 2, 2020.

*Primary Examiner* — Lessanework Seifu
(74) *Attorney, Agent, or Firm* — Locke Lord LLP; Scott D. Wofsy; Gabby L. Gelozin

(57) ABSTRACT

A powder cleaning system can include a fluidized bed reactor configured to retain powder and fluidize the powder to remove adsorbate and/or other contaminants from the powder, at least one inlet line, and one or more gas sources configured to be in selective fluid communication with the fluidized bed reactor via the at least one inlet line to selectively provide an inlet flow having one or more gases to the fluidized bed reactor to fluidize the powder with the one or more gases within the fluidized bed reactor. The system can include at least one outlet line in fluid communication with the fluidized bed reactor and configured to allow removal of outlet flow which comprises the adsorbate and/or other contaminants from the fluidized bed reactor.

12 Claims, 2 Drawing Sheets

(51) Int. Cl.
*B22F 1/00* (2006.01)
*B33Y 40/00* (2020.01)
*B01J 8/00* (2006.01)
*B01J 8/44* (2006.01)
*B33Y 10/00* (2015.01)
*B22F 10/20* (2021.01)

(56) References Cited

U.S. PATENT DOCUMENTS

| | | |
|---|---|---|
| 9,555,474 B2 | 1/2017 | She et al. |
| 9,732,422 B2 * | 8/2017 | She .................... C23C 16/24 |
| 10,011,892 B2 | 7/2018 | Szuromi et al. |
| 2014/0216586 A1 | 8/2014 | Tanaka et al. |
| 2017/0044354 A1 * | 2/2017 | She .................... H01B 1/22 |
| 2018/0002815 A1 | 1/2018 | McGee et al. |

FOREIGN PATENT DOCUMENTS

| | | |
|---|---|---|
| EP | 1942078 A1 | 7/2008 |
| JP | H0889785 A | 4/1996 |
| WO | 2015023438 | 2/2015 |
| WO | 2016118551 | 7/2016 |

* cited by examiner

POWDER CLEANING SYSTEMS AND METHODS

BACKGROUND

1. Field

The present disclosure relates to powder, e.g., for additive manufacturing.

2. Description of Related Art

For superalloys (e.g. Fe—Ni based, Ni based, and Co based), the relation between surface adsorbed species and mechanical properties (i.e. after densification) has been well documented. Significant effects of oxygen levels on tensile, impact, and creep properties, etc. have been reported. Oxygen at powder surfaces can contribute significantly to the weakening of interparticle boundaries. A prior particle boundary (PPB) issue has been observed during hot isostatic pressing (HIP) and selective laser melting (SLM) of IN718 superalloy.

The presence of highly stable surface oxides has been shown to have detrimental effects on HIP and SLM. The PPB issue was shown to result from surface contamination with pre-alloyed powder and oxide particles formed along the PPB. The precipitates are very brittle, thereby potentially providing a fracture path. Thus, use of traditional powder result in limits placed on consolidated products formed from the powder. Despite significant efforts to reduce the effects of PPB's, and thereby extend the life of related products (e.g., with aerospace applications), there is still no effective and reliable method to do so.

Such conventional methods and systems have generally been considered satisfactory for their intended purpose. However, there is still a need in the art for improved powder cleaning systems and methods. The present disclosure provides a solution for this need.

SUMMARY

A powder cleaning system can include a fluidized bed reactor configured to retain powder and fluidize the powder to remove adsorbate and/or other contaminants from the powder, at least one inlet line, and one or more gas sources configured to be in selective fluid communication with the fluidized bed reactor via the at least one inlet line to selectively provide an inlet flow having one or more gases to the fluidized bed reactor to fluidize the powder with the one or more gases within the fluidized bed reactor. The system can include at least one outlet line in fluid communication with the fluidized bed reactor and configured to allow removal of outlet flow which comprises the adsorbate and/or other contaminants from the fluidized bed reactor.

The system can include a filter for capturing particles, the filter disposed in the at least one outlet line. The system can include a liquid trap disposed downstream of the filter and configured to trap liquid entrained in the outlet flow. The liquid trap can include a vent for venting gas of the outlet flow.

The inlet line can include at least one inlet line valve configured to selectively allow flow from the one or more gas sources to the fluidized bed reactor. The system can include a bypass line configured to fluidly connect the inlet line and the liquid trap to allow at least some gas in the inlet line to flow to the vent, wherein the bypass line includes a bypass valve configured to selectively allow bypass flow.

The system can include a pressure release valve (PRV) disposed in the inlet line to allow bleeding of pressure above a threshold pressure. The system can include a pressure sensor downstream of the PRV.

The at least one inlet line valve can be downstream of the pressure sensor. The one or more gas sources can each include a source valve and/or a mass flow controller (MFC) for controlling an amount and/or proportion of each gas in the inlet flow. The one or more gas sources can include at least one of an argon (Ar) source, an ammonia ($NH_3$) source, a nitrogen ($N_2$) source, a hydrogen ($H_2$) source or a helium (He) source.

The fluidized bed reactor can include an outer housing defining an outer space and a powder container disposed within the outer space and defining an inner space. The fluidized bed reactor can include a gas distributor plate between the outer space and the inner space at the bottom of the powder container. The gas distributor plate can include a plurality of holes smaller than particles of the powder configured to prevent powder from falling through the plate and to allow the inlet gas to pass therethrough into the powder within the powder container to fluidize the powder. The inlet line can be in fluid communication with the outer space and the outlet line is in fluid communication with the inner space such that inlet gas must flow through the gas distributor plate and the powder.

In certain embodiments, a temperature sensor can be disposed in thermal communication with the outer space to sense a temperature of the inlet gas, and a temperature sensor in thermal communication with the outlet line to sense a temperature of the outlet gas. In certain embodiments, the system can include a heater or cooler disposed in thermal communication with the inlet flow to control the temperature of the inlet flow.

A method for cleaning a powder can include fluidizing powder in a fluidized bed reactor with an inlet gas to remove adsorbate and/or other contaminants to produce cleaned powder. Fluidizing powder includes flowing gas through the powder in a direction opposite to gravity. The inlet gas can include at least one of argon (Ar), ammonia ($NH_3$), nitrogen ($N_2$), hydrogen ($H_2$), or helium (He). Fluidizing the powder can be performed after at least one of powder production, powder characterization and/or testing, and/or powder processing. Fluidizing powder can include controlling a temperature and/or pressure of the inlet gas as a function of one or more powder characteristics. The method can include sintering the cleaned powder to form an additively manufactured article.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
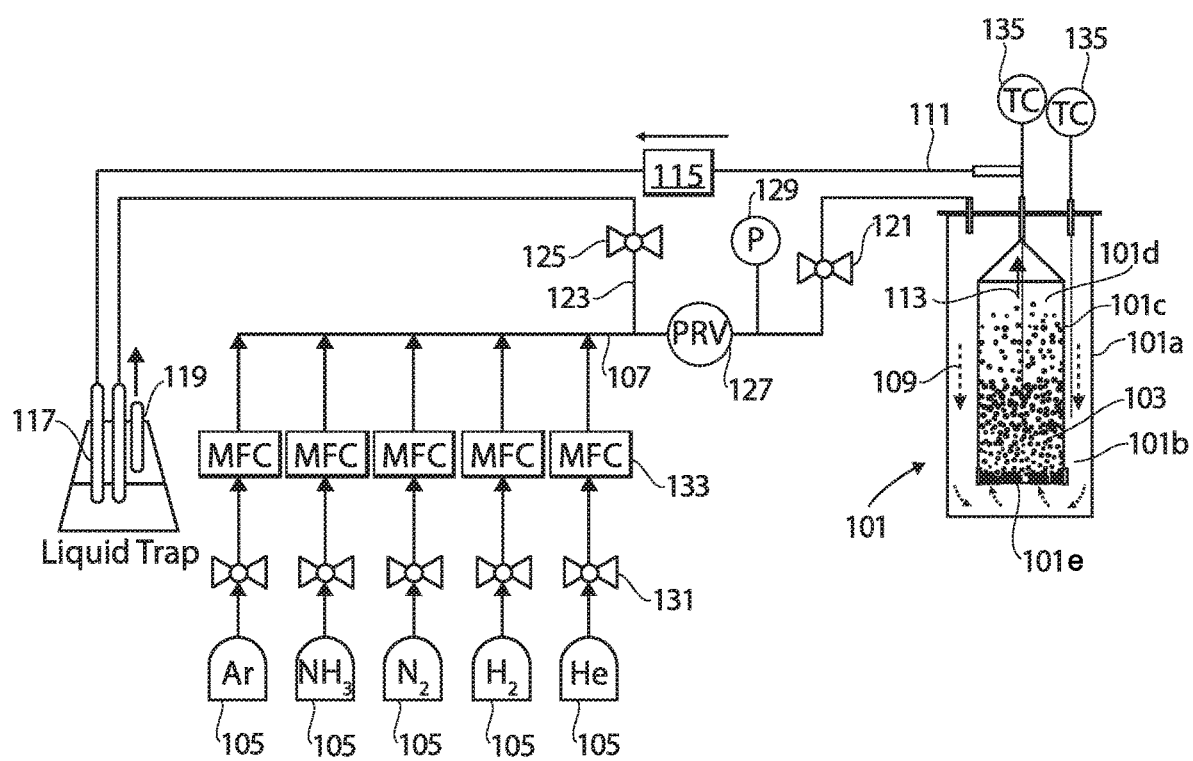
FIG. 1 is a schematic diagram of an embodiment of a system in accordance with this disclosure, showing powder being fluidized.
Figure 2:
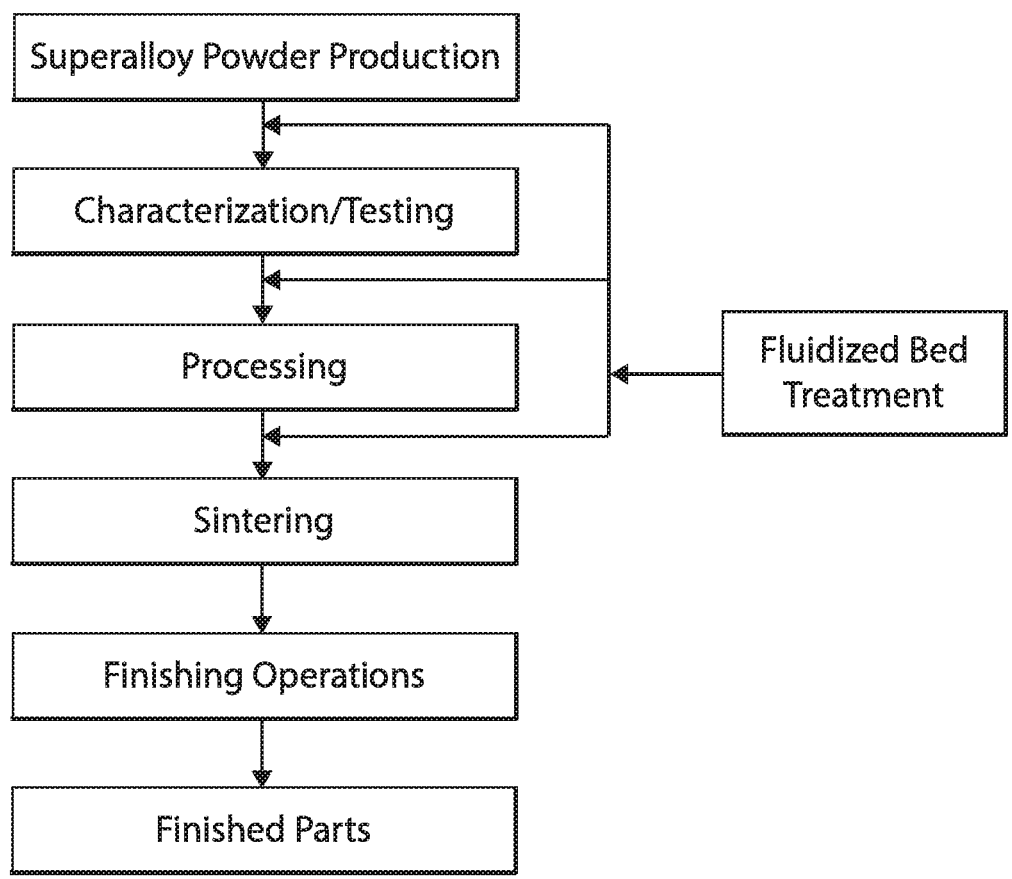
FIG. 2 is a flow diagram of an embodiment of a method in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. The systems and methods described herein can be used to clean powder (e.g., removing moisture and oxygen adsorbed by the powder) used for additive manufacturing (e.g., alloy powder), for example, Selective Laser Melting (SLM), Direct Metal Laser Sintering (DMLS), Electron Beam Melting (EBM), etc.

Referring to FIG. 1, a powder cleaning system 100 can include a fluidized bed reactor 101 configured to retain powder 103 and fluidize the powder 103 to remove adsorbate (e.g., moisture, oxygen) and/or other contaminants (e.g., dirt or other impurity) from the powder 103. The system 100 can include one or more gas sources 105 configured to be in selective fluid communication with the fluidized bed reactor 101 via at least one inlet line 107 to selectively provide an inlet flow 109 having one or more gases to the fluidized bed reactor 101 to fluidize the powder 103 with the one or more gases within the fluidized bed reactor 101. The system 100 can include at least one outlet line 111 in fluid communication with the fluidized bed reactor 101 which can be configured to allow removal of outlet flow 113 which comprises the adsorbate and/or other contaminants from the fluidized bed reactor 101.

The system 100 can include a filter 115 for capturing particles, the filter 115 disposed in the at least one outlet line 111. The system 100 can include a liquid trap 117 disposed downstream of the filter 115 and configured to trap liquid and/or powder entrained in the outlet flow 113. The liquid trap 117 can include a vent 119 for venting gas of the outlet flow 113, for example.

The inlet line 107 can include at least one inlet line valve 121 configured to selectively allow flow from the one or more gas sources 105 to the fluidized bed reactor 101. The system 100 can include a bypass line 123 configured to fluidly connect the inlet line 107 and the liquid trap 117 to allow at least some gas in the inlet line 107 to flow to the vent 119. The bypass line 123 can include a bypass valve 125 configured to selectively allow bypass flow. In certain embodiments, the bypass line 123 and bypass valve 125 can be utilized to prevent pressure spikes in the fluidized bed reactor 101. In certain embodiments, the bypass valve 125 and the inlet line valve 121 can be a single three way valve to select between open, closed, or bypass, or to regulate between open and bypass states in any suitable manner.

The system 100 can include a pressure release valve (PRV) 127 disposed in the inlet line 107 (e.g., downstream of the bypass line 123) and configured to allow bleeding of pressure above a threshold pressure. The PRV 127 can be or include a check valve, for example, or any other suitable valve (e.g., to actuate a threshold pressure to avoid overpressure of the reactor 101). The system 100 can include a pressure sensor 129 downstream of the PRV 127, for example, or in any other suitable location in the inlet line 127.

The at least one inlet line valve 121 can be downstream of the pressure sensor 129. The one or more gas sources 105 can each include a source valve 131 and/or a mass flow controller (MFC) 133 for controlling an amount and/or proportion of each gas in the inlet flow 109. The one or more gas sources 105 can include at least one of an argon (Ar) source, an ammonia ($NH_3$) source, a nitrogen ($N_2$) source, a hydrogen ($H_2$) source, or a helium (He) source, or any combination thereof, e.g., as shown.

The fluidized bed reactor 101 can include an outer housing 101a defining an outer space 101b and a powder container 101c disposed within the outer space 101b and defining an inner space 101d. The fluidized bed reactor 101 can include a gas distributor plate 101e between the outer space 101b and the inner space 101d at a bottom of the powder container 101c as shown. The gas distributor plate 101e can include a plurality of holes smaller than particles of the powder 103 configured to prevent powder 103 from falling through the plate 101e and to allow the inlet gas 109 to pass therethrough into the inner space 101d to fluidize the powder 103 within the powder container 101c. As shown, the inlet line 107 can be in fluid communication with the outer space 101b and the outlet line 111 can be in fluid communication with the inner space 101d such that inlet gas 109 must flow through the gas distributor plate 101e and the powder 103.

In certain embodiments, a temperature sensor 135 can be disposed in thermal communication with the outer space 101b to sense a temperature of the inlet gas 109, and a temperature sensor 135 can be disposed in thermal communication with the outlet line 111 to sense a temperature of the outlet gas 113. In certain embodiments, the system 100 can include a heater or cooler disposed in thermal communication with the inlet flow 109 (e.g., in inlet line 107) to control a temperature of the inlet flow 109.

In certain embodiments, the system can include a controller (not shown) operatively connected to each of the valves 121, 125, 131 and/or sensors 129, 135 to control a state of the system 100. The controller can include any suitable software and/or hardware modules to perform any suitable function, e.g., those disclosed herein. For example, at start up, the controller can open the bypass valve 125 before or while opening one or more of the source valves 131 and/or inlet line valve 121 to prevent a pressure spike in the fluidization bed reactor 101. The controller can close the bypass valve 125 after steady state operation is reached either completely and/or partially to regulate pressure to the fluidization bed reactor 101. Any valve disclosed herein can be a shut off valve or a pressure regulating valve, or any other suitable valve. For example, inlet line valve 121 can be configured to regulate pressure.

The controller can be operatively connected to a heater or cooler to control the temperature of the inlet gas. In certain embodiments, the controller can include settings configured to provide a certain pressure, gas mixture or type, and temperature to the inlet flow 109 based on one or more powder characteristics (e.g., powder type, particle size, powder chemistry, amount of powder).

Referring to FIG. 2, a method 200 for cleaning a powder can include fluidizing powder in a fluidized bed reactor with an inlet gas to remove adsorbate and/or other contaminants to produce cleaned powder. Fluidizing powder includes flowing gas through the powder in a direction opposite to gravity. The inlet gas can include at least one of argon (Ar), ammonia ($NH_3$), nitrogen ($N_2$), hydrogen ($H_2$), or helium (He).

As shown, fluidizing the powder can be performed after at least one of powder production, powder characterization and/or testing, and/or powder processing. Fluidizing powder can include controlling a temperature and/or pressure and/or a gas composition of the inlet gas as a function of one or more powder characteristics. The method can include sintering the cleaned powder to form an additively manufactured article.

In certain embodiments, argon, nitrogen, and/or helium can be used for removing oxygen and moisture adsorbed by the powder, and ammonia, hydrogen, and/or nitrogen can be used to treat powder after removal of the adsorbed oxygen and moisture. Any single gas and/or any combination (e.g., diluted ammonia) can be used.

Certain embodiments can utilize a fluidized bed reactor to displace undesirable adsorbed species (i.e. oxygen, moisture, etc.) on superalloy powder surfaces, for example. Embodiments of the reactor technique involve suspending solid particles by upward fluid flow. Rapid heat and mass transfer between the gas and solid particles can provide an alternative approach to other powder treatment methods. The treatment conditions (i.e. fluidization velocity, temperature, time, gas compositions, etc.) can be determined on a case-by-case basis according to the superalloy powder properties (e.g. particle diameter, density, etc.), surface oxygen contamination, and desired level of oxygen removal. Embodiments provide a flexible, economically feasible, and scalable method of uniform particle mixing and temperature gradients. Embodiments can remove surface oxygen without affecting bulk structure or morphology.

In certain embodiments, the first step in powder metallurgy (PM) processes can be the fabrication of metal powders. Removal of surface oxygen by fluidized bed gas reaction can be implemented at a several stages during the fabrication process as well as along the pathway of generating a finished part. Example processes used in powder production include solid-state reduction, atomization, electrolysis, and chemical.

In solid-state reduction, an ore material is first crushed (usually mixed with carbon), and passed through a furnace whereby the carbon and oxygen are reduced from the powder leaving behind a compacted sponge metal which crushed, separated from all non-metallic material, and sieved.

In the atomization process, molten metal is separated into small droplets and frozen rapidly before the drops come into contact with each other or with a solid surface. The technique is applicable to all metals that can be melted.

Electrolysis is carried out by selecting conditions, such as electrolyte composition and concentration, temperature, and current density, many metals current density whereby metals are deposited in a spongy or powdery state. Subsequent processing such as washing, drying, reducing, annealing, and crushing is often required to produce high-purity and high-density powders. However, due to high energy costs, this process is typically limited to high-value powders.

The chemical method is the most common whereby chemical powder treatments involve oxide reduction, precipitation from solutions, and thermal decomposition. The powders produced can have a great variation in properties and yet have closely controlled particle size and shape.

Embodiments can be used as post-processing stage associated with any of the processes mentioned above, for example, to generate low oxygen/moisture surfaces. Embodiments can be used at any other suitable point, e.g., before sintering of the powder.

As will be appreciated by those skilled in the art, aspects of the present disclosure may be embodied as a system, method, or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A powder cleaning system, comprising:
a fluidized bed reactor configured to retain powder and fluidize the powder to remove adsorbate and/or other contaminants from the powder;
at least one inlet line;
one or more gas sources configured to be in selective fluid communication with the fluidized bed reactor via the at least one inlet line to selectively provide an inlet flow having one or more gases to the fluidized bed reactor to fluidize the powder with the one or more gases within the fluidized bed reactor;
at least one outlet line in fluid communication with the fluidized bed reactor and configured to allow removal of outlet flow which comprises the adsorbate and/or other contaminants from the fluidized bed reactor;
a bypass line configured to fluidly connect the inlet line and the liquid trap to allow at least some gas in the inlet line to flow to the vent, wherein the bypass line includes a bypass valve configured to selectively allow bypass flow; and
pressure release valve (PRV) disposed in the inlet line to allow bleeding of pressure above a threshold pressure, wherein the PRV is downstream of the bypass line.

2. The system of claim 1, further comprising a filter for capturing particles, the filter disposed in the at least one outlet line.

3. The system of claim 2, further comprising a liquid trap disposed downstream of the filter and configured to trap liquid entrained in the outlet flow.

4. The system of claim 3, wherein the liquid trap includes a vent for venting gas of the outlet flow.

5. The system of claim 4, wherein the inlet line includes at least one inlet line valve configured to selectively allow flow from the one or more gas sources to the fluidized bed reactor.

6. The system of claim 1, further comprising a pressure sensor downstream of the PRV.

7. The system of claim 6, wherein the at least one inlet line valve is downstream of the pressure sensor.

8. The system of claim 7, wherein the one or more gas sources each include a source valve and a mass flow controller (MFC) for controlling an amount and/or proportion of each gas in the inlet flow.

9. The system of claim 8, wherein the one or more gas sources can include at least one of an argon (Ar) source, an ammonia ($NH_3$) source, a nitrogen ($N_2$) source, a hydrogen ($H_2$) source or a helium (He) source.

10. The system of claim 1, wherein the fluidized bed reactor includes an outer housing defining an outer space and a powder container disposed within the outer space and defining an inner space.

11. The powder container of claim 10, further comprising a gas distributor plate between the outer space and the inner space at a bottom of the powder container, wherein the gas distributor plate includes a plurality of holes smaller than particles of the powder configured to prevent powder from falling through the gas distributor plate and to allow the inlet gas to pass therethrough into the powder within the powder container to fluidize the powder, wherein the inlet line is in fluid communication with the outer space and the outlet line is in fluid communication with the inner space such that inlet gas must flow through the gas distributor plate and fluidize the powder.

12. The system of claim 11, further comprising a temperature sensor disposed in thermal communication with the outer space to sense a temperature of the inlet gas, and a temperature sensor in thermal communication with the outlet line to sense a temperature of the outlet gas.

* * * * *